(12) United States Patent
Chang

(10) Patent No.: US 8,555,657 B2
(45) Date of Patent: Oct. 15, 2013

(54) ENVIRONMENT CONTROL APPARATUS FOR CULTIVATING PLANTS

(75) Inventor: Chung-Liang Chang, Pingtung County (TW)

(73) Assignee: National Pingtung University of Science and Technology, Pingtun County (TW)

( * ) Notice: Subject to any disclaimer, the term of this patent is extended or adjusted under 35 U.S.C. 154(b) by 403 days.

(21) Appl. No.: 13/072,897

(22) Filed: Mar. 28, 2011

(65) Prior Publication Data

US 2011/0259019 A1   Oct. 27, 2011

(30) Foreign Application Priority Data

Apr. 23, 2010   (TW) .............................. 99112880 A

(51) Int. Cl.
*F25B 21/02*   (2006.01)

(52) U.S. Cl.
USPC ................................ 62/3.6; 62/3.7; 62/238.2

(58) Field of Classification Search
USPC ................ 62/3.6, 3.2, 3.3, 3.7, 138.2, 259.2; 165/104.33, 272; 136/200, 203, 218; 361/679.47, 679.52
See application file for complete search history.

(56) References Cited

U.S. PATENT DOCUMENTS

| | | | | |
|---|---|---|---|---|
| 4,312,402 A * | 1/1982 | Basiulis | ................... | 165/104.22 |
| 5,368,786 A * | 11/1994 | Dinauer et al. | ............... | 261/130 |
| 5,414,591 A * | 5/1995 | Kimura et al. | ................ | 361/695 |
| 5,987,890 A * | 11/1999 | Chiu et al. | ........................ | 62/3.2 |
| 6,109,039 A * | 8/2000 | Hougham et al. | ............... | 62/3.7 |
| 6,990,816 B1 * | 1/2006 | Zuo et al. | .......................... | 62/3.7 |
| 2002/0144811 A1 * | 10/2002 | Chou et al. | .................... | 165/236 |
| 2003/0110691 A1 | 6/2003 | Weder | | |
| 2003/0126882 A1 * | 7/2003 | Hunter | ......................... | 62/457.2 |
| 2005/0006754 A1 * | 1/2005 | Arik et al. | ...................... | 257/712 |
| 2005/0103615 A1 * | 5/2005 | Ritchey | ............................. | 203/10 |
| 2005/0220167 A1 * | 10/2005 | Kanai et al. | ..................... | 374/16 |
| 2006/0236928 A1 * | 10/2006 | Goto et al. | .................... | 118/302 |
| 2009/0301687 A1 * | 12/2009 | Watts | ........................... | 165/48.2 |
| 2010/0293851 A1 | 11/2010 | Weder | | |

* cited by examiner

*Primary Examiner* — Mohammad M Ali
(74) *Attorney, Agent, or Firm* — Alan Kamrath; Kamrath IP Lawfirm, P.A.

(57) ABSTRACT

An environment control apparatus for cultivating plants includes a casing having a bottom with first and second holes. A thermoelectric cooling module is mounted in the first hole and includes first and second sides. The first side faces the casing. A temperature control pipe includes two ends connected to a heat reservoir. The temperature control pipe includes a heat exchanging section in contact with the second side of the thermoelectric cooling module. A first power device is mounted on the temperature control pipe. An auxiliary heat pipe includes two ends connected to the heat reservoir. The auxiliary heat pipe includes a heat dissipating section located in the second hole. A processor is coupled to the thermoelectric cooling module and the first power device.

13 Claims, 6 Drawing Sheets

ENVIRONMENT CONTROL APPARATUS FOR CULTIVATING PLANTS

BACKGROUND OF THE INVENTION

1. Field of the Invention

The present invention relates to an environment control apparatus and, more particularly, to an environment control apparatus for cultivating plants.

2. Description of the Related Art

Cultivation of plants generally proceeds in an environment control box for mass propagation of seedlings. Typically, control of the temperature in the environment control box is achieved by using a mechanical switch of air conditioner type to touch a limit switch through thermal expansion and contraction by a refrigerant, causing the limit switch to be on or off at a contact point of the limit switch so as to start or stop operation of a compressor. However, the service life of the compressor is shortened due to frequent starting and stopping. Furthermore, the switch has an offset range in the temperature, failing to provide precise control of the temperature. Further, the compressor causes operation noise, and use of the refrigerant is not eco-friendly.

Use of thermoelectric cooling module in environmental control boxes has become a trend. The thermoelectric cooling modules convert electricity into heat to control the temperature in the environmental control boxes. However, several disadvantages still exist in actual use. Firstly, a cooler is required on the hot-surface-side of a thermoelectric cooling module to avoid the thermoelectric cooling module from being damaged due to overheat. Heat dissipation of the thermoelectric cooling module is, thus, an issue. Secondly, the heat at hot-surface-side of the thermoelectric cooling module is generally carried away by fins or a fan after the thermoelectric cooling module is electrified, failing to reuse the heat.

SUMMARY OF THE INVENTION

The primary objective of the present invention is to provide an environment control apparatus for cultivating plants including a thermoelectric cooling module, wherein the heat generated by the thermoelectric can be stored for reuse, saving energy and reducing emission of carbon.

The secondary objective of the present invention is to provide an environment control apparatus for cultivating plants including a thermoelectric cooling module cooperating with a temperature control pipe to improve heat dissipation of the thermoelectric cooling module.

An environment control apparatus for cultivating plants according to the present invention includes a casing having a bottom with first and second holes. A thermoelectric cooling module is mounted in the first hole and includes first and second sides. The first side faces the casing. A temperature control pipe includes two ends connected to a heat reservoir. The temperature control pipe includes a heat exchanging section in contact with the second side of the thermoelectric cooling module. A first power device is mounted on the temperature control pipe. An auxiliary heat pipe includes two ends connected to the heat reservoir. The auxiliary heat pipe includes a heat dissipating section located in the second hole. A processor is coupled to the thermoelectric cooling module and the first power device.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
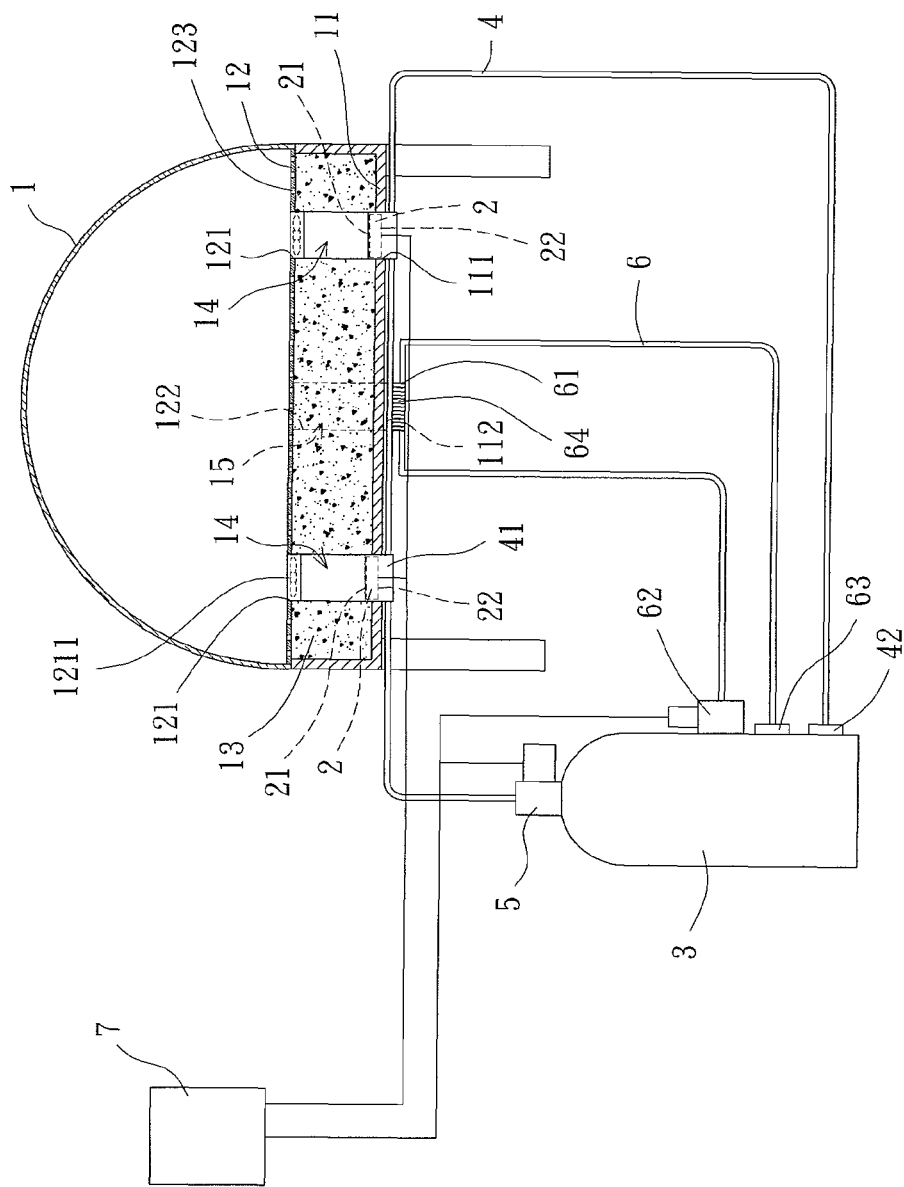
FIG. 1 shows a schematic cross sectional view of an environment control apparatus for cultivating plants of a first embodiment according to the present invention.
Figure 2:
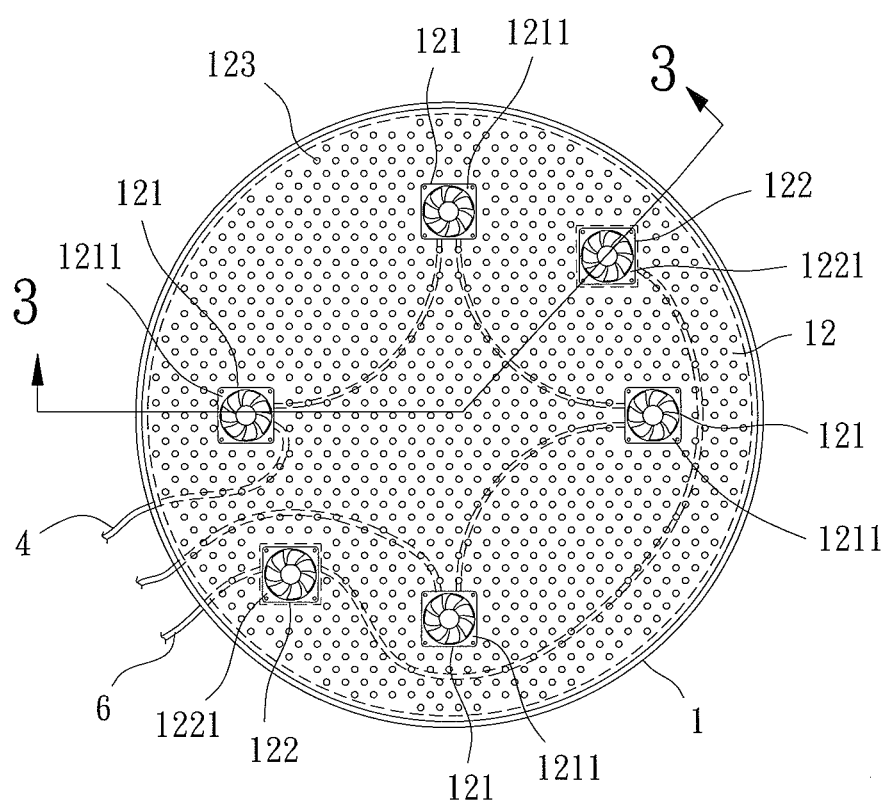
FIG. 2 shows a top view of the environment control apparatus of FIG. 1.
Figure 3:
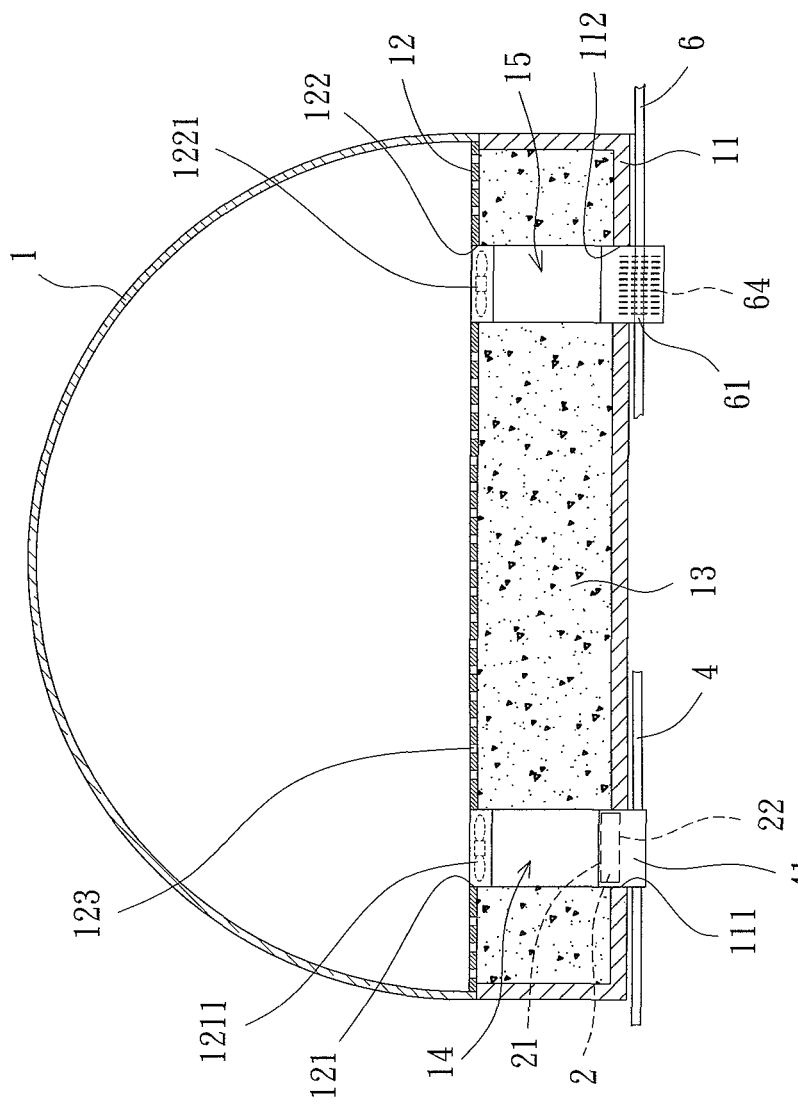
FIG. 3 shows a cross sectional view of the environment control apparatus of FIG. 1 according to section line 3-3 of FIG. 2.

With reference to FIGS. 1-3, an environment control apparatus for cultivating plants of a first embodiment according to the present invention includes a casing 1, a plurality of thermoelectric cooling modules 2, a heat reservoir 3, a temperature control pipe 4, a first power device 5, an auxiliary heat pipe 6, and a processor 7. The thermoelectric cooling modules 2 are received in the casing 1 and in contact with an outer periphery of the temperature control pipe 4. Two ends of the temperature control pipe 4 are connected to the heat reservoir 3. The first power device 5 is mounted on the temperature control pipe 4. Two ends of the auxiliary heat pipe 6 are connected to the heat reservoir 3. The processor 7 is coupled to the thermoelectric cooling modules 2 and the first power device 5.

The casing 1 can be a hollow semi-sphere. However, the outline of the casing 1 does not have to resemble a semi-sphere. Other similar outlines of the casing 1 are still within the scope of the present invention. The casing 1 includes a bottom 11 having a plurality of first holes 111 and a plurality of second holes 112. The casing 1 further includes a partitioning board 12 having a plurality of first openings 121, a plurality of second openings 122, and a plurality of holes 123. The partitioning board 12 is located above the bottom 11. A compartment 13 is defined between the bottom 11 and the partitioning board 12. Preferably, a fan 1211 is mounted in each first opening 121, and a fan 1221 can be mounted in each second opening 122 according to the user needs, as shown in FIG. 3.

The casing 1 further includes a plurality of first passageways 14 and a plurality of second passageways 15. Two ends of each first passageway 14 are respectively connected to one of the first holes 111 and one of the first openings 121. Two ends of each second passageway 15 are respectively connected to one of the second holes 112 and one of the second openings 122. The first and second passageways 14 and 15 are located between the bottom 11 and the partitioning board 12.

Each thermoelectric cooling module 2 includes first and second sides 21 and 22. Each thermoelectric cooling module 2 is mounted in a respective one of the first holes 111, with the first side 21 facing the partitioning board 12 of the casing 1. Although there are four thermoelectric cooling modules 2, four first holes 111, the first openings 121, and four fans 1211 in the embodiment shown in FIGS. 1 and 2, the environment control apparatus can include a larger or smaller number of the thermoelectric cooling modules 2, the first holes 111, the first openings 121, and the fans 1211. As an example, the environment control apparatus can include one thermoelectric cooling module 2, one first hole 111, one first opening 121, and one fan 1211 only, depending on the user needs.

With reference to FIG. 1, the heat reservoir 3 is in the form of a hollow casing. Two ends of the temperature control pipe 4 are connected to the heat reservoir 3. The first power device 5 is mounted on the temperature control pipe 4 to circulate a fluid in the temperature control pipe 4. Thus, the fluid in the temperature control pipe 4 can be brought into the heat reservoir 3. Preferably, the first power device 5 is a pump.

Figure 4:
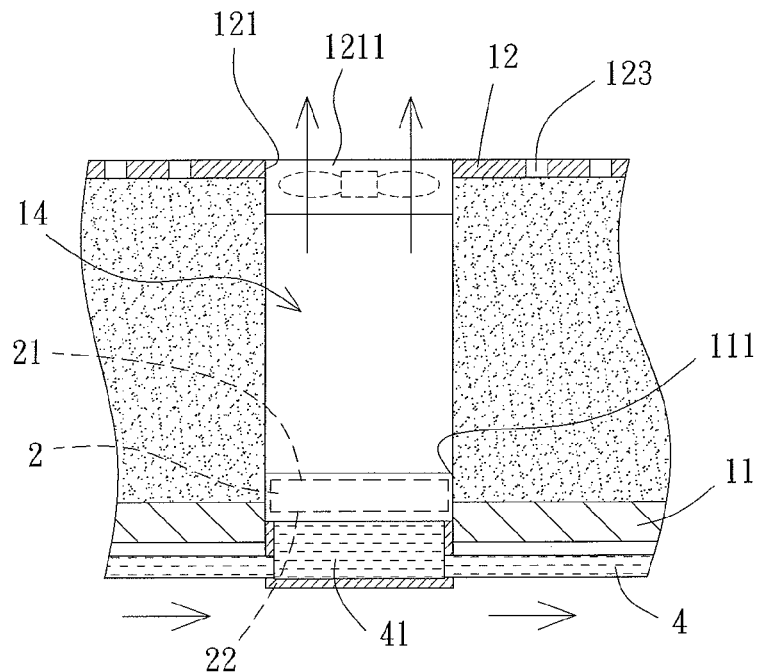
FIG. 4 shows a partial, cross sectional view of the environment control apparatus of FIG. 1, illustrating a portion of a temperature control pipe of the environment control apparatus.

With reference to FIGS. 1 and 4, the temperature control pipe 4 includes a plurality of heat exchanging sections 41 each in the form of a chamber for a corresponding thermoelectric cooling module 2. An outer wall of the heat exchanging section 41 is in contact with the second side 22 of the thermoelectric cooling module 2. A first control valve 42 can be mounted in at least one of two ends of the temperature control pipe 4 according to the user needs, avoiding backflow of the fluid in the temperature control pipe 4.

Figure 5:
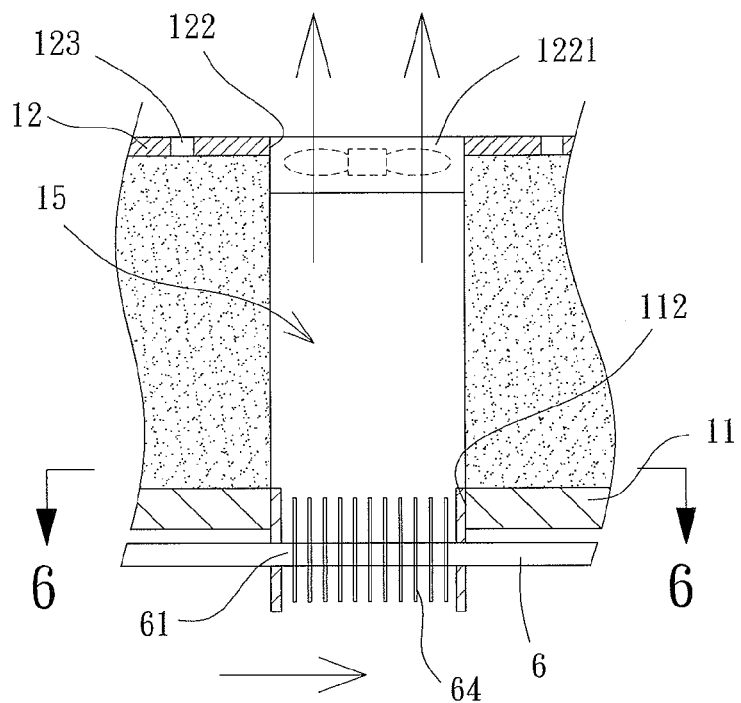
FIG. 5 shows a partial, cross sectional view of the environment control apparatus of FIG. 1, illustrating a portion of an auxiliary heat pipe of the environment control apparatus.
Figure 6:
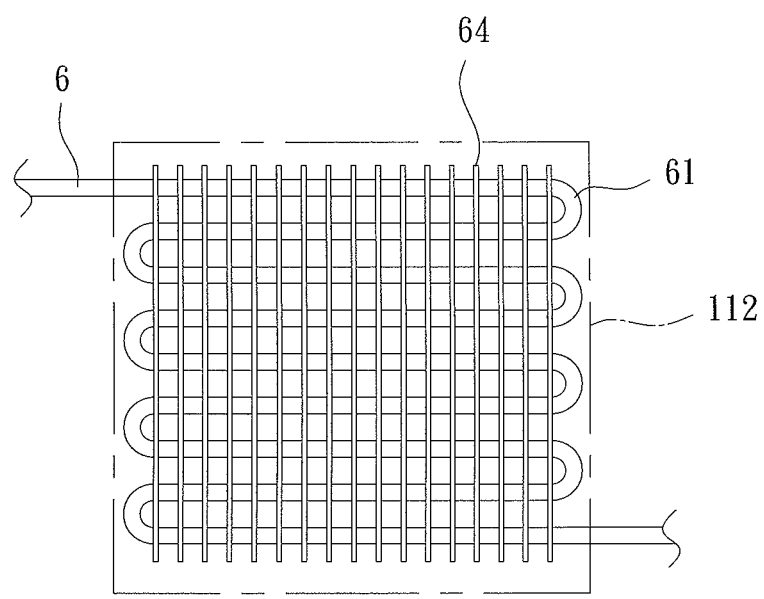
FIG. 6 shows a cross sectional view of the environment control apparatus of FIG. 1 according to section line 6-6 of FIG. 5.

With reference to FIGS. 1 and 5, two ends of the auxiliary heat pipe 6 are connected to the heat reservoir 3. The auxiliary heat pipe 6 includes a plurality of heat dissipating sections 61 each for a corresponding second hole 112. With reference to FIG. 6, the heat dissipating section 61 is a continuous pipeline including a plurality of S-shaped bends. The heat dissipating section 61 can include a plurality of fins 64 extending across an outer periphery of the continuous pipeline according to the user needs. The auxiliary heat pipe 6 further includes a second power device 62 mounted thereon for circulating a fluid in the auxiliary heat pipe 6, bringing the fluid in the auxiliary heat pipe 6 into the heat reservoir 3. Preferably, the second power device 62 is a pump. A second control valve 63 can be mounted in at least one of two ends of the auxiliary heat pipe 6 according to the user needs, avoiding backflow of the fluid in the auxiliary heat pipe 6. The processor 7 is coupled to the thermoelectric cooling modules 2, the fans 1211 and 1221, and the first and second power devices 5 and 62. The processor 7 can change the direction of the electric current of each thermoelectric cooling module 2, such that the thermoelectric cooling modules 2 provide heating or cooling function. Also, the processor 7 controls starting and stopping and the speed of the fans 1211 and 1221 and controls starting and stopping of the first and second power devices 5 and 62.

The environment control apparatus can be utilized to cultivate ordinary crops or high-altitude carnivorous plants. With reference to FIG. 3, cultivation liquid or soil is placed in the compartment 13. The plants can grow upward through the holes 123. Particularly, to avoid uneven distribution of temperature in the casing 1, the thermoelectric cooling modules 2 are mounted in different locations. The temperature in the environment control apparatus can be controlled as desired by using the processor 7 controlling the thermoelectric cooling modules 2.

With reference to FIG. 4, in a case that the temperature in the environment control apparatus is to be lowered, the direction of the electric current in each thermoelectric cooling module 2 is changed so that the first side 21 is the hot side and that the second side 22 is the cool side. Cool air is blown by the fans 1211 into an interior of the casing 1 through the first openings 121 to lower the temperature in the interior of the casing 1. With reference to FIGS. 1 and 4, the first power device 5 causes circulation of the fluid in the temperature control pipe 4. The heat generated at the second sides 22 of the thermoelectric cooling modules 2 can be carried to and stored in the heat reservoir 3 through provision of the heat exchanging sections 41.

With reference to FIG. 4, in a case that the temperature in the environment control apparatus is to be increased, the direction of the electric current in each thermoelectric cooling module 2 is changed so that the first side 21 is the cool side and that the second side 22 is the hot side. Hot air is blown by the fans 1211 into an interior of the casing 1 through the first openings 121 to increase the temperature in the interior of the casing 1. With reference to FIGS. 1 and 4, to avoid the temperature at the cool sides from being transmitted through the temperature control pipe 4 to the heat reservoir 3, a first control valve 42 is mounted to at least one of two ends of the temperature control pope 4. Specifically, the first control valve 42 avoids reverse flow of the fluid in the temperature control pipe 4, preventing transmission of the temperature at the cool sides to the heat reservoir 3 through the temperature control pipe 4. Alternatively, the flowing rate of the fluid in the temperature control pipe 4 driven by the first power device 5 can be reduced to avoid the temperature at the cool sides from being transmitted through the temperature control pipe 4 to the heat reservoir 3. Because the flow rate of the fluid in the temperature control pipe 4 driven by the first power device 5 is reduced or stopped to reduce the flow rate of the fluid in the temperature control pipe 4 flowing to the heat reservoir 3.

However, if the temperature increasing effect is not satisfactory, the second power device 62 can be activated to drive the fluid in the auxiliary heat pipe 6 to flow, transmitting the heat stored in the heat reservoir 3 to the heat dissipating sections 61 of the auxiliary heat pipe 6 (FIG. 1). With reference to FIG. 5, the fans 1221 mounted in the second openings 122 can be driven to transmit the heat generated at the heat dissipating sections 61 into the interior of the casing 1, rapidly increasing the temperature. With reference to FIG. 6, the contact area between the heat dissipating section 61 and the air is significantly increased by the arrangement of the continuous pipeline including S-shaped bends and by the provision of the fins 64, enhancing the temperature increasing effect.

Figure 7:
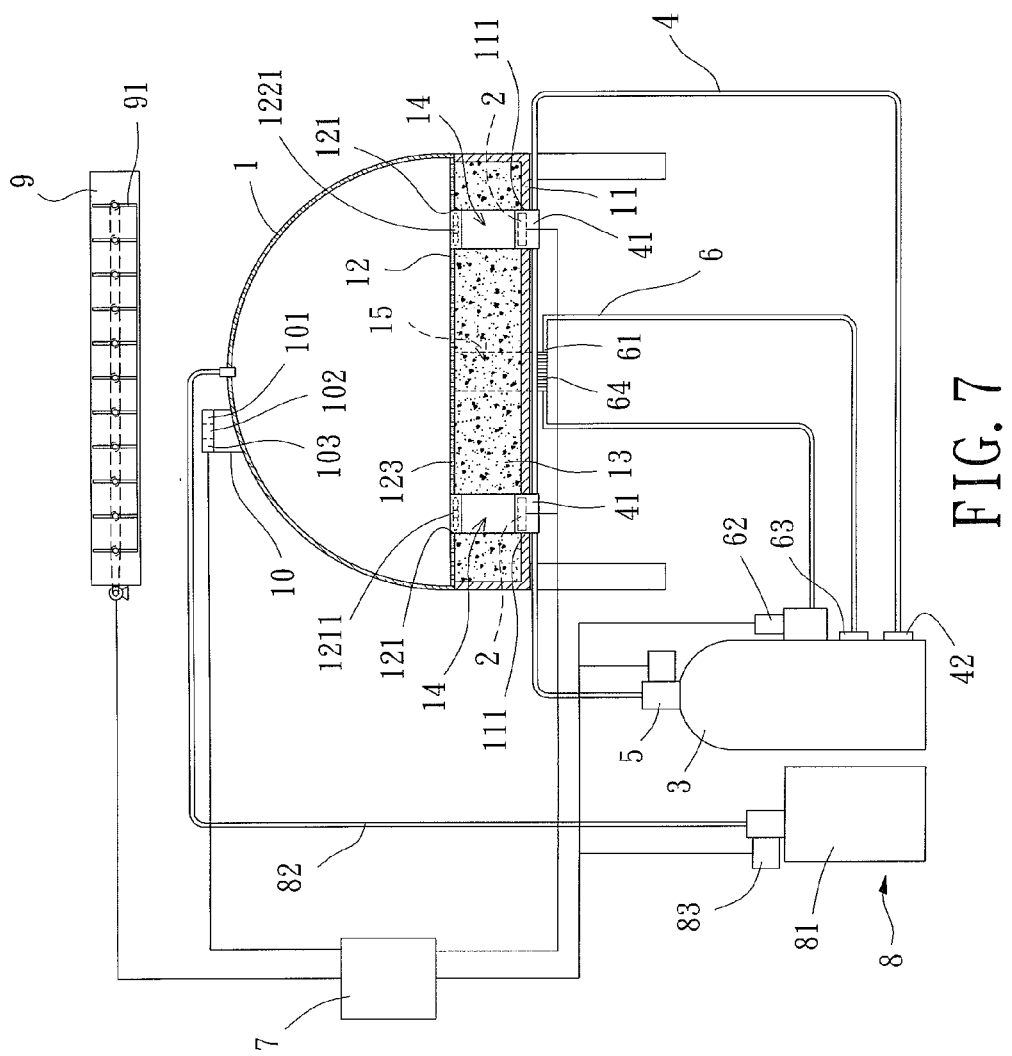
FIG. 7 shows a schematic cross sectional view of an environment control apparatus for cultivating plants of a second embodiment according to the present invention.

With reference to FIG. 7, an environment control apparatus for cultivating plants of a second embodiment according to the present invention includes a casing 1, a plurality of thermoelectric cooling modules 2, a heat reservoir 3, a temperature control pipe 4, a first power device 5, an auxiliary heat pipe 6, a processor 7, a humidity control module 8, a luminosity control module 9, and a detection module 10. The casing 1, the thermoelectric cooling modules 2, the heat reservoir 3, the temperature control pipe 4, the first power device 5, the auxiliary heat pipe 6, and the processor 7 are identical to those in the first embodiment and, thus, not described in detail to avoid redundancy.

The humidity control module 8 is coupled to the processor 7 and includes a container 81 and a humidity control pipe 82. An end of the humidity control pipe 82 is connected to the container 81. The other end of the humidity control pipe 82 is connected to the casing 1. The container 81 is hollow and receives a fluid. Preferably, the humidity control module 8 further includes a third power device 83 mounted on the humidity control pipe 82 for bringing the fluid in the container 81 into the humidity control pipe 82. Preferably, the third power device 83 is a pump 83.

The luminosity control module 9 is coupled to the processor 7 and mounted above the casing 1. The luminosity control module 9 includes a plurality of blade units 91. The luminosity of the environment control apparatus can be controlled through the blade units 91. When the light is insufficient, the blade units 91 are opened to allow more light. On the other hand, when the light is too much, the blade units 91 are closed to reduce the light entering the environment control apparatus.

The detection module 10 is mounted on the casing 1 and includes a temperature detection module 101, a humidity detection module 102, and a luminosity detection module 103. The temperature detection module 101 detects the temperature in the interior of the environment control apparatus and generates a temperature signal indicative of the temperature. The humidity detection module 102 detects the humidity in the interior of the environment control apparatus and generates a humidity signal indicative of the humidity. The luminosity detection module 103 detects the luminosity in the interior of the environment control apparatus and generates a luminosity signal indicative of the luminosity. The detection module 10 can be coupled to the processor 7. Alternatively, the detection module 10 includes a wireless transmitter transmitting the temperature signal, the humidity signal, and the luminosity signal to the processor 7.

The environment control apparatus can set and adjust the temperature, humidity, and luminosity therein separately.

The adjustment/control of the temperature is achieved by the processor 7 controlling the direction of the electric current in each thermoelectric cooling module 2 to obtain the temperature increasing effect or the temperature decreasing effect. When the temperature increasing effect is not satisfactory, the heat stored in the heat reservoir 3 can be transmitted into the interior of the casing 1.

The adjustment/control of the humidity is achieved by the processor 7 controlling the third power device 83 of the humidity control module 8. When the humidity is too low, the processor 7 activates the third power device 83 to sprinkle the fluid in the container 81 into the interior of the casing 1 through the humidity control pipe 82. A nozzle can be mounted to an end of the humidity control pipe 82 adjacent to the casing 1 according to the user needs. The nozzle can atomize the fluid from the container 81 and eject the atomized fluid into the interior of the casing 1. Preferably, the fluid in the container 81 is water.

The adjustment/control of the luminosity is achieved by the processor 7 controlling the luminosity control module 9 coupled to the processor 7 and mounted above the casing 1. The luminosity control module 9 includes a plurality of blade units 91. The luminosity of the environment control apparatus can be controlled through the blade units 91. When the light is insufficient, the blade units 91 are opened to allow more light. On the other hand, when the light is too much, the blade units 91 are closed to reduce the light entering the environment control apparatus.

The environment control apparatus according to the present invention includes one or more thermoelectric cooling units 2, wherein the heat generated by the thermoelectric cooling units 2 can be stored and reused, saving energy and reduces emission of carbon.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An environment control apparatus for cultivating plants comprising:
   a casing including a bottom having first and second holes;
   a thermoelectric cooling module including first and second sides, with the first side facing the casing, with the thermoelectric cooling module mounted in the first hole;
   a hollow heat reservoir;
   a temperature control pipe including two ends connected to the heat reservoir, with the temperature control pipe including a heat exchanging section in contact with the second side of the thermoelectric cooling module;
   a first power device mounted on the temperature control pipe;
   an auxiliary heat pipe including two ends connected to the heat reservoir, with the auxiliary heat pipe including a heat dissipating section located in the second hole; and
   a processor coupled to the thermoelectric cooling module and the first power device.

2. The environment control apparatus for cultivating plants as claimed in claim 1, further comprising: a partitioning board including a plurality of holes, a first opening, and a second opening, with the partitioning board mounted in the casing and located above the bottom, with a compartment defined between the bottom of the casing and the partitioning board.

3. The environment control apparatus for cultivating plants as claimed in claim 2, further comprising: first and second passageways located between the bottom of the casing and the partitioning board, with the first passageway having two ends respectively connected to the first hole and the first opening, with the second passageway having two ends respectively connected to the second hole and the second opening.

4. The environment control apparatus for cultivating plants as claimed in claim 2, further comprising: a fan mounted in the first hole and coupled to the processor.

5. The environment control apparatus for cultivating plants as claimed in claim 2, further comprising: a fan mounted in the second hole and coupled to the processor.

6. The environment control apparatus for cultivating plants as claimed in claim 1, further comprising: a control valve mounted to at least one of the two ends of the temperature control pipe.

7. The environment control apparatus for cultivating plants as claimed in claim 1, further comprising: a control valve mounted to at least one of the two ends of the auxiliary heat pipe.

8. The environment control apparatus for cultivating plants as claimed in claim 1, with the heat dissipating section a plurality of fins extending across an outer periphery thereof.

9. The environment control apparatus for cultivating plants as claimed in claim 1, with the heat dissipating section including a plurality of S-shaped bends.

10. The environment control apparatus for cultivating plants as claimed in claim 1, further comprising: a second power device mounted on the auxiliary heat pipe and coupled to the processor.

11. The environment control apparatus for cultivating plants as claimed in claim 1, further comprising: a humidity control module coupled to the processor, with the humidity control module including a container and a humidity control pipe, with the humidity control pipe including a first end connected to the container and a second end connected to the casing.

12. The environment control apparatus for cultivating plants as claimed in claim 11, further comprising: a third power device mounted on the humidity control pipe and coupled to the processor.

13. The environment control apparatus for cultivating plants as claimed in claim 1, further comprising: a luminosity control module coupled to the processor, with the luminosity control module mounted above the casing and including a plurality of blade units.

\* \* \* \* \*